United States Patent

[11] 3,587,150

| [72] | Inventor | Roger Menard |
| | | Roxboro, Quebec, Canada |
| [21] | Appl. No. | 757,579 |
| [22] | Filed | Sept. 5, 1968 |
| [45] | Patented | June 28, 1971 |

[54] MILLING CUTTER
4 Claims, 4 Drawing Figs.

[52] U.S. Cl. ........................................................ 29/105
[51] Int. Cl. ........................................................ B26d 1/12
[50] Field of Search ............................................ 29/105, 103, 105.1

[56] References Cited
UNITED STATES PATENTS
| 2,186,423 | 1/1940 | Miller ......................... | 29/105 |
| 2,684,520 | 7/1954 | Severson ..................... | 29/105 |
| 2,972,802 | 2/1961 | Stein ........................... | 29/105 |
| 3,138,847 | 6/1964 | Berry, Jr. ..................... | 29/105 |
| 3,200,474 | 8/1965 | Kralowetz ................... | 29/105 |

*Primary Examiner*—Harrison L. Hinson
*Attorney*—Raymond A. Robic

ABSTRACT: A milling cutter for cutting kerfs or right-angular corners, comprising a disc having a central bore adapted to be mounted on a rotating spindle and provided with peripheral adjacent recesses extending across the width of the disc and opening on the peripheral side thereof; each recess housing a cutter blade outwardly protruding from one lateral open side and from the peripheral side of each recess; said blades are arranged in a staggered relationship with respect to the lateral protruding edge of each blade and are so inclined inside said recesses as to provide a clearance angle necessary for the cutting operation.

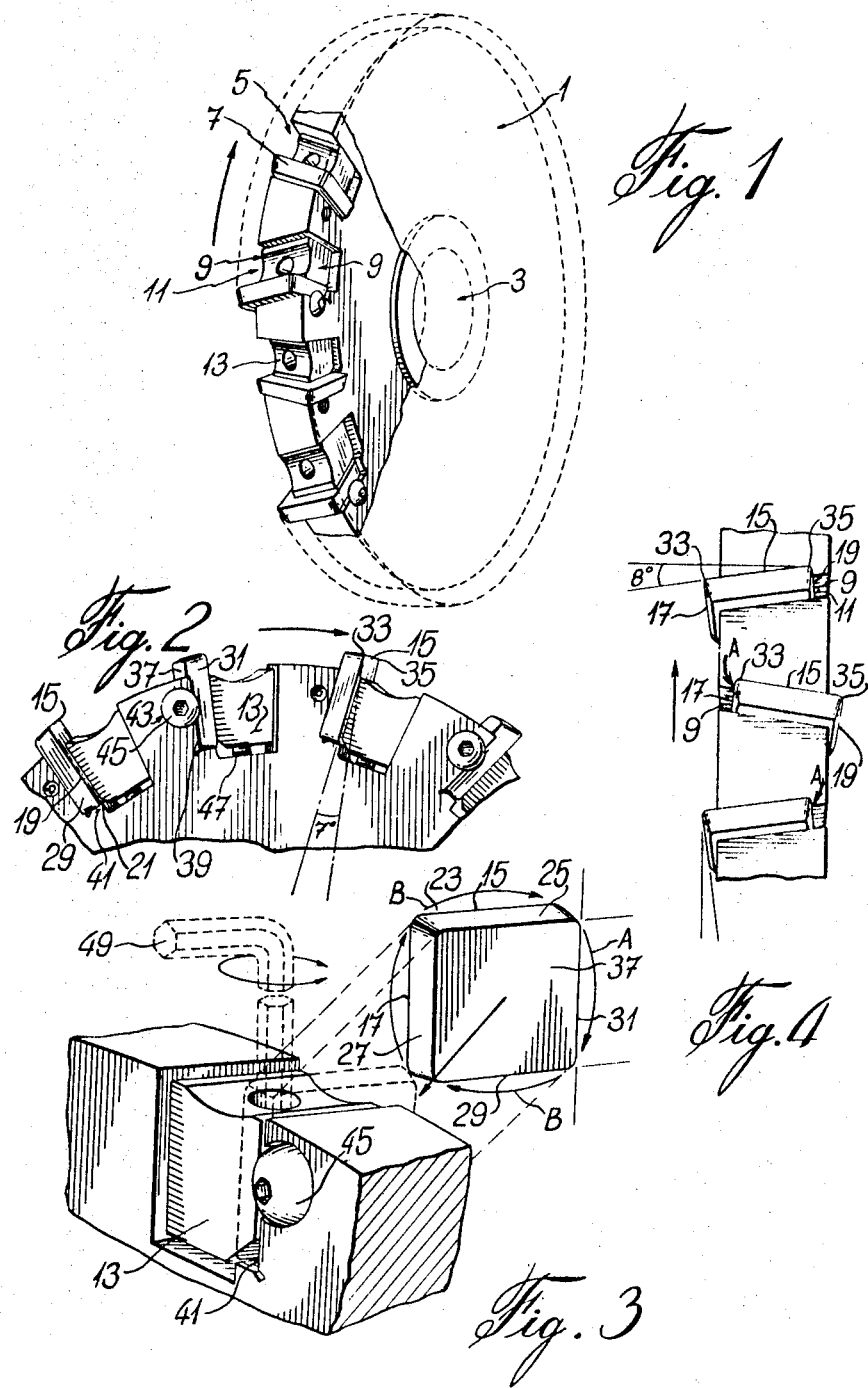

MILLING CUTTER

BACKGROUND OF THE INVENTION

1. Field of the Invention

The present invention relates to a milling cutter for cutting right-angular slots or kerfs or shaping right-angular corners in metal bodies.

2. Description of the Prior Art

Milling cutters already exist in industry. Some are made of a cylindrical body portion provided with cutting teeth arranged, in a predetermined manner, at the periphery thereof, said teeth forming integral parts with said body portion; others are made of disc-shaped bodies adapted to house cutting blades in recesses provided at their peripheries.

However, the already existing milling cutters present features which are considered as drawbacks in everyday machine workshops. The first type of cutters is expensive in its manufacture considering that the peripheral teeth and cylindrical body portion are made from the same metal which, necessarily, must be of a solid and wear-resistant material for providing the necessary stiffness to the working teeth. Once a tooth is seriously damaged, the whole cutter is to be put out of service. The second type of cutters is not adapted to cut all sorts of slots or kerfs and is only used for milling into a corner on a workpiece.

SUMMARY OF THE INVENTION

The present invention has for its objects a milling cutter which overcomes the above-mentioned drawbacks. More specifically, the invention lies in the provision of a milling cutter which comprises a disc-shaped body having a central bore adapted to be mounted on a rotating spindle. The disc-shaped body is provided with peripheral adjacent recesses extending across the width of the disc from one lateral side to the other and opening on the peripheral side of said disc-shaped body. A cutter blade is seated in each recess and each blade has a portion radially protruding from the peripheral side of said recess and a portion laterally protruding from one of said two lateral sides; two laterally protruding portions of two adjacent blades being positioned in a staggered relationship with respect to each other. The blades are so inclined and positioned inside the recesses that they provide a clearance angle necessary for the cutting operation. Furthermore, each blade is laterally movable inside each recess for varying the width of the resulting kerfs.

One advantage of the present invention is that the milling cutter is adapted to mill indifferently kerfs and/or corner angles and yet have a low manufacturing cost considering that the teeth forming separate parts of the disc-shaped body have only to be of a high-resistant material whereas the body itself is made of a lighter and less expensive metal.

Another advantage is that, the blades being laterally adjustable inside the recesses, the same milling cutter is more versatile, and may be used for obtaining kerfs of different widths.

A further advantage is that the inclination of each blade is so arranged that the cutting pressure is exerted, contrary to the existing cutter, on the corner of the cutting edge, opposite the protruding corner, which is solidly backed in each recess, thus diminishing the risk of damages.

Still another advantage is that it is possible to use the cutter in horizontal and vertical positions.

Other advantages and features will be apparent during the course of the following description.

BRIEF DESCRIPTION OF THE DRAWINGS

A preferred embodiment of the invention will now be described with reference to the appended drawings wherein:

FIG. 1 is a fragmentary, perspective view of the new disc-shaped cutter;

FIG. 2 is a fragmentary, side elevation view of this embodiment;

FIG. 3 is a fragmentary, perspective view of a unit cutter blade and a peripheral recess, illustrating the operation for securing a blade inside a recess; and FIG. 4 is a fragmentary, schematic top view showing a peripheral side portion of this embodiment.

DESCRIPTION OF THE PREFERRED EMBODIMENT

As shown in FIG. 1, the milling cutter according to the invention comprises a disc-shaped body 1 (the complete circumference being shown in dashed lines) having a central bore 3 adapted to be mounted on a spindle (not shown). The periphery of the disc-shaped body 1 is provided with adjacent recesses 5 inside each of which is located a cutter blade 7. The recesses 5 extend the full width of the body that is, from one lateral side 9 to the other 9 and open on the peripheral side 11 of the disc-shaped body.

Each blade 7 is fixedly secured inside each recess 5 by means of wedges or clamping blocks 13.

The blades 7 are made of high speed steel iron carbide or any other suitable means depending on the use of the cutter.

As illustrated in FIG. 3, each cutter blade has the form of a frustum of a rectangular pyramid. The cutting edges 15, 17, 19 and 21 of a blade (19 and 21 not shown on FIG. 3) are formed at the junction of the large base surface 23 and the four inclined lateral sides 25, 27, 29 and 31 of the frustum of a pyramid.

In its operative position each blade has an edge 15 (see FIG. 4) radially protruding from the peripheral side 11 of each recess and an edge 17 or 19 laterally protruding from one of the two lateral sides 9 thereof. Two adjacent blades have their laterally protruding edges 17 and 19 arranged in a staggered relationship with respect to each other i.e. protrude alternatively from the lateral sides 9.

Notwithstanding the fact that each blade has two edges 15 and 17 (or 19) protruding from each recess it is only the peripheral edge 15 which works as a cutting edge, this because of the inclinations of the blades which will be hereinafter described.

Each blade is forwardly inclined in the direction of the rotation relative to a radius of the disc-shaped body (see FIG. 2 wherein this inclination forms an angle of 7°), and each laterally protruding edge 17 (or 19) is rearwardly inclined with respect to the rotating direction about an axis being common with the opposite lateral edge 19 (or 17) of the blade (see FIG. 4 wherein this inclination forms an angle of 8°). Due to this latter inclination the radii of the two end corners 33 and 35 (FIG. 4) are at uneven distances from the axis of rotation. In fact, assuming that the edge 17 is rearwardly inclined about the opposite edge 19 (FIG. 4), the corner 33 corresponding to the edge 17 will have a radius of rotation larger than the corner 35 corresponding to the opposite edge 19 which has not moved, this, due to the fact that the corner 33 will have the hypotenuse of a triangle as radius of rotation. To correct this difference of radii in order to obtain a plane surface with the cutting is performed, the corner 33 (or 35) is raised with respect to the opposite laterally protruding corner 35 (or 33). In the preferred embodiment herein described the first two inclinations are of 7° and 8°, respectively, as shown in FIGS. 2 and 4, and the third inclination which corresponds to the raising of the corner 33 (or 35) with respect to the opposite corner 35 (or 33) has a value of 0°, 45. These preferred angles are not exclusively useful for the present embodiment.

The clearance angle necessary for the cutting operation is provided by the combination of the above-mentioned inclinations. For a cutter blade of three-fourths of an inch, the clearance is about 0.009.

The inclinations of the blades as previously described permit to the cutting pressure to be exerted on the inner end corner 33 (or 35) of the cutting edge 15, (indicated by arrow A in FIG. 4) thus, diminishing the risk of damages of the cutting edge.

The recesses 5 are so provided and shaped as to receive the blades 7 and to position them in desired directions. The small base surface 37 of each blade seats against one vertical side 39 of each recess (FIG. 2) and the lateral side 29 of the frustum of a pyramid, opposite the peripheral cutting edge 15, seats on a seat portion 41 extending throughout the width of the recess. The portions 41 are ground to be exactly coplanar or flush with each other. The vertical sides 39 of the recesses backing the blades 7 are also ground so that the identically inclined recesses be provided with exactly parallel backing surfaces. This construction permits the indexing of the blades and their simultaneous engagement with the surface of the work, so that each blade does its share of cutting.

When the operating cutting edges are dull and a substitution is needed, the blades are rotated as shown by the arrows B in FIG. 3 so that a new cutting edge comes into operative position. In this way, the same blade is used four times before sharpening of the edges is necessary.

FIG. 2 shows screws 43 fixed adjacent to the vertical backing side 39 of the recesses 5 and which have their heads 45 holding a portion of the lateral side 31 (or 27) of the frustum of a pyramid opposite the laterally protruding edge 17 (or 19) of each blade. These screws are provided for varying the lateral positioning of the blades 7 and controlling the width of the resulting kerfs.

Clamping blocks or wedges 13 are provided inside the recesses 5 for fixedly securing the blades against the seating and backing portions thereof. These clamping blocks are fixed by means of screws 47 tightened by an hexagonal key 49 (FIG. 3).

As previously mentioned, the milling cutter may also be mounted on a vertical spindle for milling into a corner of a workpiece.

I claim:

1. A milling cutter for cutting kerfs, slots, right-angular corners or the like in metal bodies comprising:
   a. a disc-shaped body having a central bore adapted to be mounted on a spindle;
   b. said body being provided with adjacent peripheral recesses extending across the disc-shaped body and opening on the peripheral side thereof, the lateral faces of the recesses are alternatively angularly disposed relative to the perpendicular with the plane of the disc;
   c. a plurality of cutter blades, each blade having the shape of a frustum of a square pyramid having a flat large and small base surface, each intersection of the four inclined lateral sides with the large base surface forming each a cutting edge, each cutter blade seating at the bottom and across one of said peripheral recesses on a portion of the said body adapted to support one lateral side of a cutter blade, each cutter blade having an edge radially protruding from the peripheral side of the body and an edge laterally protruding from one of the two lateral faces of the said body, said radially protruding edge forming a cutting edge and two adjacent blades having their laterally protruding edges arranged in a staggered relationship with respect to each other;
   d. a block member removably fixed to the bottom of each recess and in contact with the blade for tightly securing the blade against a lateral side of the recess;
   e. a screw member having a large head is threadedly engaged in said body adjacent a lateral side of each blade, the said head partly abutting the said adjacent lateral side of the blade opposite the laterally protruding edge to define a predetermined lateral position for the blade,
   wherein each blade is adapted to be loosened between the body and the contacting block member and rotated by an angle of 90° and relocated in contact with the seating portion of the body and the head of the screw member so that the protruding edges of the blades remain in the same radial and lateral planes.

2. A milling cutter as recited in claim 1, wherein each blade is forwardly inclined, at a predetermined angle, in the direction of the rotation relative to a radius of the body, and each laterally protruding edge is rearwardly inclined, at a predetermined angle, with respect to the direction of the rotation of the cutter blade, relative to the plane of said disc-shaped body and each cutting blade is inclined, at a predetermined angle, towards the laterally protruding edge of each blade, said blade thus positioned providing a clearance angle necessary for the cutting operation.

3. A milling cutter as recited in claim 2, wherein the back side of the recess is forwardly inclined relative to the radius and angularly inclined relative to the perpendicular with the plane of the disc, and the small base of the blade is in contact with said inclined back side.

4. A milling cutter as recited in claim 1, wherein the screw member is positioned adjacent the small base of the blade.